United States Patent
Zhang et al.

(10) Patent No.: US 11,840,751 B2
(45) Date of Patent: Dec. 12, 2023

(54) BORON-BASED AMORPHOUS ALLOYS AND PREPARATION METHOD THEREOF

(71) Applicant: DALIAN UNIVERSITY OF TECHNOLOGY, Liaoning (CN)

(72) Inventors: Wei Zhang, Liaoning (CN); Yanhui Li, Liaoning (CN); Leiqiang Lai, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 632 days.

(21) Appl. No.: 17/053,293

(22) PCT Filed: May 19, 2020

(86) PCT No.: PCT/CN2020/090938
§ 371 (c)(1),
(2) Date: Nov. 5, 2020

(87) PCT Pub. No.: WO2020/238690
PCT Pub. Date: Dec. 3, 2020

(65) Prior Publication Data
US 2021/0254198 A1     Aug. 19, 2021

(30) Foreign Application Priority Data
May 27, 2019   (CN) .......................... 201910447946.5

(51) Int. Cl.
| | | |
|---|---|---|
| *C22C 1/00* | (2023.01) | |
| *C22C 29/14* | (2006.01) | |
| *C22C 30/00* | (2006.01) | |
| *C22C 45/00* | (2023.01) | |
| *C01B 35/04* | (2006.01) | |
| *C21D 1/42* | (2006.01) | |
| *C21D 1/74* | (2006.01) | |
| *C22C 1/11* | (2023.01) | |

(52) U.S. Cl.
CPC .............. *C22C 29/14* (2013.01); *C01B 35/04* (2013.01); *C21D 1/42* (2013.01); *C21D 1/74* (2013.01); *C22C 1/11* (2023.01); *C22C 30/00* (2013.01); *C22C 45/00* (2013.01)

(58) Field of Classification Search
CPC ......... C22C 29/14; C22C 30/00; C22C 45/00; C22C 1/11; C22C 1/00; C22C 33/00; C22C 38/32; C22C 19/07; C01B 35/04
See application file for complete search history.

(56) References Cited

FOREIGN PATENT DOCUMENTS

| | | | | |
|---|---|---|---|---|
| CN | 1566394 A | | 1/2005 | |
| CN | 109 402 530 A | * | 3/2019 | ............... C22C 1/11 |
| CN | 109402530 A | | 3/2019 | |
| CN | 109499574 A | | 3/2019 | |
| CN | 110106454 A | | 8/2019 | |
| JP | 2006 219 723 A | * | 8/2006 | ............. C22C 38/00 |
| JP | 2014-127700 A | | 7/2014 | |

OTHER PUBLICATIONS

Louzguine, D. V. et al., "Multicomponent Si-Based Amorphous Alloys Produced by Melt Spinning and Their Crystallization Behaviour," The Japan Institute of Metals and Materials, Materials Transactions, vol. 38, Issue No. 12, 1997, pp. 1095-1099.
Lai Leiqiang; "Preparation and Properties of Co-SM-B Amorphous Alloys," Master's Thesis, Dalian University of Technology, Material Processing Engineering, May 27, 2019, Published Feb. 15, 2020, 69 pages (ISSN:1674-0246).
International Search Report and Written Opinion dated Aug. 5, 2020 issued in corresponding International Application No. PCT/CN2020/090938.

* cited by examiner

*Primary Examiner* — Timothy C Vanoy
(74) *Attorney, Agent, or Firm* — Muncy, Geissler, Olds & Lowe, P.C.

(57) ABSTRACT

Boron-based amorphous alloys and a preparation method thereof is provided. The composition formula of the alloys is $B_a Co_b RE_c X1_d X2_e X3_f$, wherein RE is any one or more of La, Ce, Pr, Nd, Sm, Gd, Dy, Er and Y; X1 is any one or more of C, Si and Al; X2 is any one or two of Fe and Ni; X3 is any one or more of Zr, Nb, Mo, Hf, Ta and W; and a, b, c, d, e and f respectively represent atomic percent of each corresponding element in the formula, where: $45 \le a \le 55$, $25 \le b \le 40$, $10 \le c \le 20$, $0 \le d \le 10$, $45 \le a+d \le 55$, $0 \le e \le 20$, $25 \le b+e \le 40$, $0 \le f \le 3$, $10 \le c+f \le 20$ and $a+b+c+d+e+f=100$. The preparation method of the boron-based amorphous alloy comprises: preparing master alloy ingots using an arc furnace or an induction melting furnace; and then obtaining amorphous ribbons with different thicknesses by a single copper roller melt-spinning equipment.

1 Claim, 2 Drawing Sheets

BORON-BASED AMORPHOUS ALLOYS AND PREPARATION METHOD THEREOF

TECHNICAL FIELD

The present invention relates to the technical field of new materials and preparation thereof, and in particular to a kind of boron-based amorphous alloys with high thermal stability, high hardness and high resistivity, and a preparation method thereof.

BACKGROUND

Amorphous alloys possess a short-range ordered and long-range disordered atomic arrangement. The unique structure makes the amorphous alloys have excellent mechanical and functional properties that are unmatched by conventional crystalline metal materials, such as high strength, high hardness, high elastic limit, high resistivity, good soft magnetic properties and high corrosion resistance.

In the past few decades, a series of amorphous alloys with excellent properties have been developed. The amorphous alloys are mainly divided into two categories, i.e., metal-metal-type amorphous alloys as represented by Cu-, Mg-, La-, Ca-, Zr- and Ti-based alloys which generally have a strong amorphous forming ability (AFA) and high thermal stability of supercooled liquid; and metal-metalloid-type amorphous alloys as represented by Fe-, Co-, Ni-, Pd- and Pt-based alloys which have extremely high strength and hardness and excellent soft magnetic properties. Non-metallic or metalloid elements like B, C, Si and P are often added into the metal-metalloid-type amorphous alloys for the improvement of the AFA. Studies have shown that increasing the content of the metalloid elements also has significant influences on the mechanical properties and electronic transport properties of the amorphous alloys. The amorphous alloys with high contents of the metalloid elements are promising structural materials and functional materials used in the fields of new energy, automobiles, and electronics.

The currently developed amorphous alloys are mainly based on the metal elements, and the non-metal or metalloid-based amorphous alloys are rarely reported. D. V. Louzguine et al. [Materials Transactions, JIM 38 (1997) 1095] have synthesized a series of Si-based amorphous alloy ribbons by adding transition metals (TM) into an Al—Si—Fe amorphous alloy system with high Si content through a rapid quenching method. The mechanical properties including strength and hardness and resistivity of the alloys are higher than those of the Al-based amorphous alloys in the same Al—Si—Fe-TM system, and are gradually increased with the increase of the Si content. Till now, B-based amorphous alloys have not been reported. Co—B binary alloys can form an amorphous structure in a wide composition range, wherein the B content can reach a maximum of 40 at. % [J. Therm. Anal. 38 (1992) 1585]. On this basis, the alloys with B content higher than 50% (i.e., B-based alloys) are expected to form the amorphous structure through multi-component alloying and other alloy composition design methods. In addition, the Young's moduli of Co and B elements are much higher than those of Al and Si, and the mixing enthalpy of Co—B atom pair is more negative than that of Al—Si atom pair. Namely, a strong bonding can be formed between the Co—B atoms, which will be favorable for improving the strength and hardness of the alloys and obtaining better thermal stability. Therefore, it is of great significance to invent novel metalloid B-based amorphous alloys with excellent functional properties that can not be met by the traditional metal-based amorphous alloys.

SUMMARY

Aiming at the blank of the technology for metalloid B-based amorphous alloys, the present invention provides a kind of B-based amorphous alloys and a preparation method thereof.

The present invention adopts the following technical solution:

B-based amorphous alloys, wherein the composition formula of the alloys is $B_a Co_b RE_c X1_d X2_e X3_f$, where RE is any one or more of La, Ce, Pr, Nd, Sin, Gd, Dy, Er, and Y; X1 is any one or more of C, Si, and Al; X2 is any one or two of Fe and Ni; and X3 is any one or more of Zr, Nb, Mo, Hf, Ta and W; and a, b, c, d, e, and f respectively represent atomic percent of each corresponding element in the formula, where $45 \leq a \leq 55$, $25 \leq b \leq 40$, $10 \leq c \leq 20$, $0 \leq d \leq 10$, $45 \leq a+d \leq 55$, $0 \leq e \leq 20$, $25 \leq b+e \leq 40$, $0 \leq f \leq 3$, $10 \leq c+f \leq 20$, and $a+b+c+d+e+f=100$.

A preparation method of the B-based amorphous alloy, comprising the following steps:

(1) Material Mixing

Weighing and mixing raw materials including B, C, Si, Al, Co, Fe, Ni, La, Ce, Pr, Nd, Sin, Gd, Dy, Er, Y, Zr, Nb, Mo, Hf, Ta and W with purity higher than 99% according to the nominal composition of the alloy; considering that some rare earth elements are volatile and burnt in the melting process, adding extra 5 wt. % of volatile rare earth elements in this step.

(2) Preparation of Master Alloy Ingot

Placing the weighed mixture in step (1) into a water-cooled copper mold of a non-consumable arc furnace; melting the mixture under an argon or nitrogen atmosphere to obtain a master alloy ingot; repeatedly melting the alloy for four times to ensure chemical homogeneity; or putting the mixture in a crucible of an induction furnace, and melting the mixture under the argon or nitrogen atmosphere to obtain the master alloy ingot with chemical homogeneity;

(3) Preparation of Amorphous Ribbon

Crushing the master alloy ingot, putting them into a quartz tube, and the preparing amorphous ribbon using a single copper roller melt-spinning technique, i.e., under the argon or nitrogen atmosphere, heating the master alloy ingot to a molten state through induction smelting; then spraying the melt by high pressure gas onto a copper roller rotating at high speed; and melt-spinning at a linear velocity for the copper roller surface of 20-40 m/s to obtain an amorphous alloy ribbon with a width of 1.5 mm and a thickness of 25-40 μm Compared with the prior art, the present invention has the following advantages:

(1) The B-based amorphous alloys provided by the present invention possess high thermal stability with an onset temperature of crystallization of over 700° C., high Vickers hardness of 1582 and high room-temperature resistivity of 4.28 μΩm, and can serve as wear-resistant and corrosion-resistant coating materials or specific functional materials in the fields of engineering or electronics.

(2) The B-based amorphous alloys provided by the present invention can be prepared in the shape of continuous ribbon by the single copper roller melt-spinning technique and can realize continuous production with a high production efficiency, which is beneficial for industrialization.

(3) The B-based amorphous alloy provided by the present invention fills the technical blank of preparation of the metalloid B-based amorphous alloy ribbon.

To sum up, the present invention provides a B-based B—Co-RE (RE refers to rare earth) amorphous alloy system with high thermal stability, high hardness and high resistivity and a preparation method thereof. The present invention fills the technical blank of the metalloid B-based amorphous alloy.

For the above reasons, the present invention can be widely popularized in the fields of new materials and preparation thereof.

DESCRIPTION OF DRAWINGS

To more clearly describe the technical solutions in the embodiments of the present invention or in prior art, the drawings required to be used in the description of the embodiments or the prior art will be simply presented below. Apparently, the drawings in the following description are merely some embodiments of the present invention, and for those ordinary skilled in the art, other drawings can also be obtained according to these drawings without contributing creative labor.

DETAILED DESCRIPTION

Figure 1:
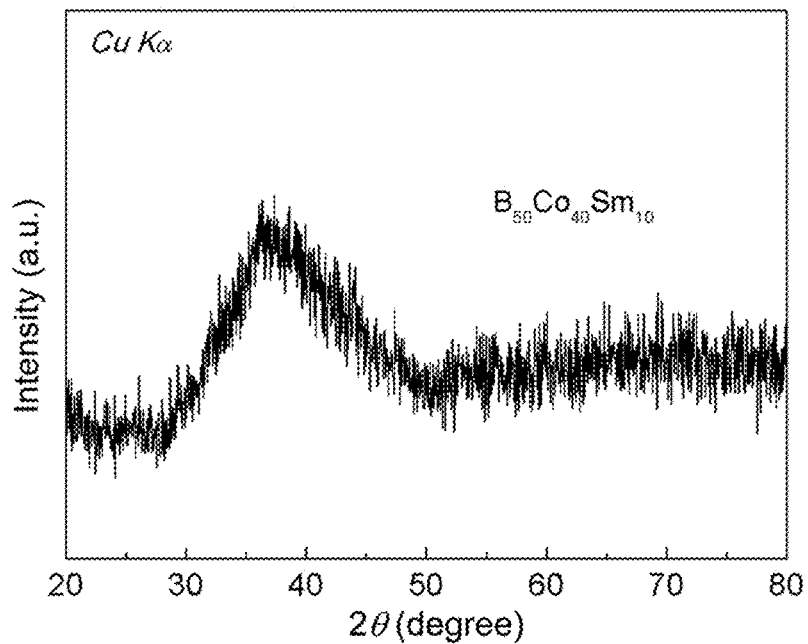
FIG. 1 shows an X-ray diffraction pattern of a $B_{50}Co_{40}Sm_{10}$ amorphous alloy ribbon with a thickness of 35 μm and a width of 1.5 mm prepared by a single copper roller melt-spinning equipment.

It should be explained that if there is no conflict, the embodiments in the present invention and the features in the embodiments can be mutually combined. The present invention will be described in detail below by reference to the drawings and in conjunction with the embodiments.

To make a purpose, a technical solution and advantages of the embodiments of the present invention more clear, the technical solution in the embodiments of the present invention will be clearly and fully described below in combination with the drawings in the embodiments of the present invention. Apparently, the described embodiments are merely part of the embodiments of the present invention, not all of the embodiments. The following description of at least one exemplary embodiment is actually only illustrative, and shall not be intended to limit the present invention and its application or use. Based on the embodiments in the present invention, all other embodiments obtained by those ordinary skilled in the art without contributing creative labor will belong to the protection scope of the present invention.

The following non-limiting embodiments may enable those ordinary skilled in the art to fully understand the present invention, but do not limit the present invention in any way.

The test methods described in the following embodiments are conventional methods unless otherwise specified; and the reagents and materials are commercially available unless otherwise specified.

The present invention provides a kind of B-based amorphous alloys with the composition formula of $B_aCo_bRE_cX1_dX2_eX3_f$, where RE is any one or more of La, Ce, Pr, Nd, Sin, Gd, Dy, Er, and Y; X1 is any one or more of C, Si, and Al; X2 is any one or two of Fe and Ni; and X3 is any one or more of Zr, Nb, Mo, Hf, Ta and W; and a, b, c, d, e, and f respectively represent atomic percent of each corresponding element in the formula, where 45≤a≤55, 25≤b≤40, 10≤c≤20, 0≤d≤10, 45≤a+d≤55, 0≤e≤20, 25≤b+e≤40, 0≤f≤3, 10≤c+f≤20, and a+b+c+d+e+f=100.

Further, the B-based amorphous alloys provided by the present invention possess high thermal stability, high hardness, high resistivity and strong AFA, and the amorphous alloy ribbons with critical thickness of not less than 25 μm can be prepared by a single copper roller melt-spinning equipment.

Further, the B-based amorphous alloys provided by the present invention have the following characteristics:
Onset temperature of crystallization is 707-820° C.;
Vickers hardness ($H_v$) is 1362-1582; Room-temperature resistivity is 2.56-4.28 μΩm.

The present invention further provides a preparation method of the B-based amorphous alloys, comprising the following steps:

(1) Material Mixing

Weighing and mixing raw materials including B, C, Si, Al, Co, Fe, Ni, La, Ce, Pr, Nd, Sin, Gd, Dy, Er, Y, Zr, Nb, Mo, Hf, Ta and W with purity higher than 99% according to the nominal composition of the alloy; considering that some rare earth elements are volatile and burnt in the melting process, adding extra 5 wt. % of volatile rare earth elements in this step.

(2) Preparation of Master Alloy Ingot

Placing the weighed mixture in step (1) into a water-cooled copper mold of a non-consumable arc furnace; melting the mixture under an argon or nitrogen atmosphere to obtain a master alloy ingot; repeatedly melting the alloy for four times to ensure chemical homogeneity; or putting the mixture in a crucible of an induction furnace, and melting the mixture under the argon or nitrogen atmosphere to obtain the master alloy ingot with chemical homogeneity;

(3) Preparation of Amorphous Ribbon

Crushing the master alloy ingot, putting them into a quartz tube, and the preparing amorphous ribbon using a single copper roller melt-spinning technique, i.e., under the argon or nitrogen atmosphere, heating the master alloy ingot to a molten state through induction smelting; then spraying the melt by high pressure gas onto a copper roller rotating at high speed; and melt-spinning at a linear velocity for the copper roller surface of 20-40 m/s to obtain an amorphous alloy ribbon with a width of 1.5 mm and a thickness of 25-40 μm Embodiment 1: $B_{50}Co_{40}Sm_{10}$ Step I: Material Mixing Raw materials including B, Co, and Sin with the purity of higher than 99 wt. % are weighed and mixed according to the nominal composition; considering that Sin is volatile and burnt, adding extra 5 wt. % of Sin;

Step II: Preparation of Master Alloy Ingot

The weighed raw materials are mixed and then put in a water-cooled copper hearth of a non-consumable arc furnace, and repeatedly melted for four times under an Ar atmosphere to obtain a master alloy ingot with homogeneous chemical composition;

Step III: Preparation of Amorphous Ribbon

The master alloy ingot is crushed and then put in a quartz tube with a nozzle diameter of about 0.5 mm, heated to a molten state through induction melting under the Ar atmosphere. The alloy melt is sprayed by a high pressure difference onto a copper roller rotating at a surface linear velocity of 30 m/s to obtain an amorphous alloy ribbon with a width of 1.5 mm and a thickness of 35 μm;

Step IV: Structural Characterization of Melt-Spun Alloy Ribbon

Figure 2:
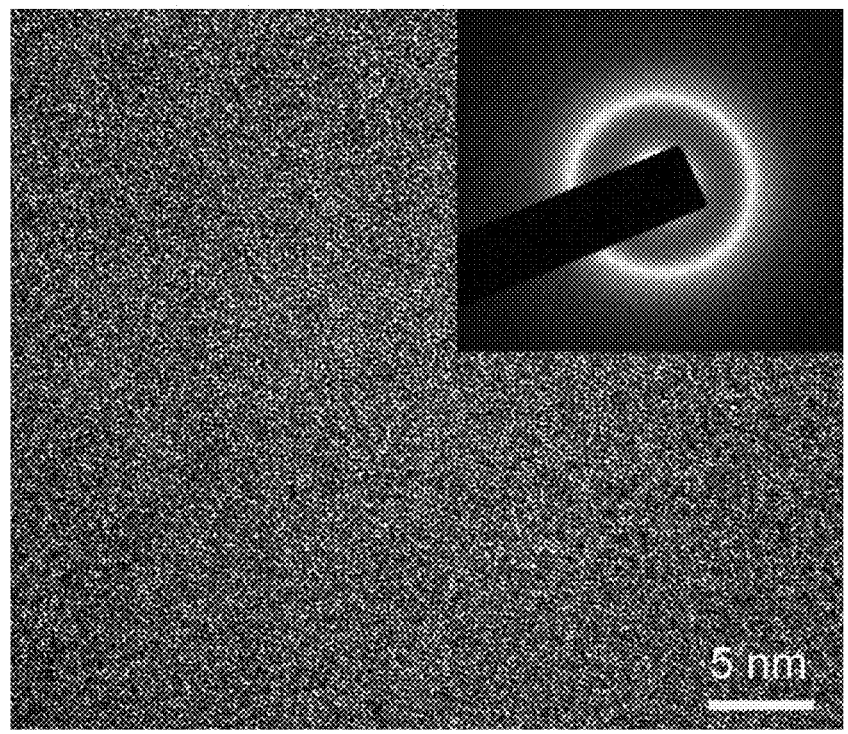
FIG. 2 shows a high-resolution transmission electron microscope image and a selected area electron diffraction pattern of a $B_{50}Co_{40}Sm_{10}$ amorphous alloy ribbon with a thickness of 35 μm and a width of 1.5 mm prepared by a single copper roller melt-spinning equipment.

X-ray diffraction (XRD) (Cu Kα) and transmission electron microscope (TEM) are used to detect the structure of the melt-spun alloy ribbon. As shown in FIG. 1, the XRD pattern demonstrates that the melt-spun alloy ribbon has a completely amorphous structure. As shown in FIG. 2, no lattice fringe appears in the high-resolution TEM and the selected area electron diffraction (SAED) pattern presents an halo characteristic, which further confirm the fully amorphous structure;

Step V: Properties Testing of Melt-Spun Alloy Ribbon

Figure 3:
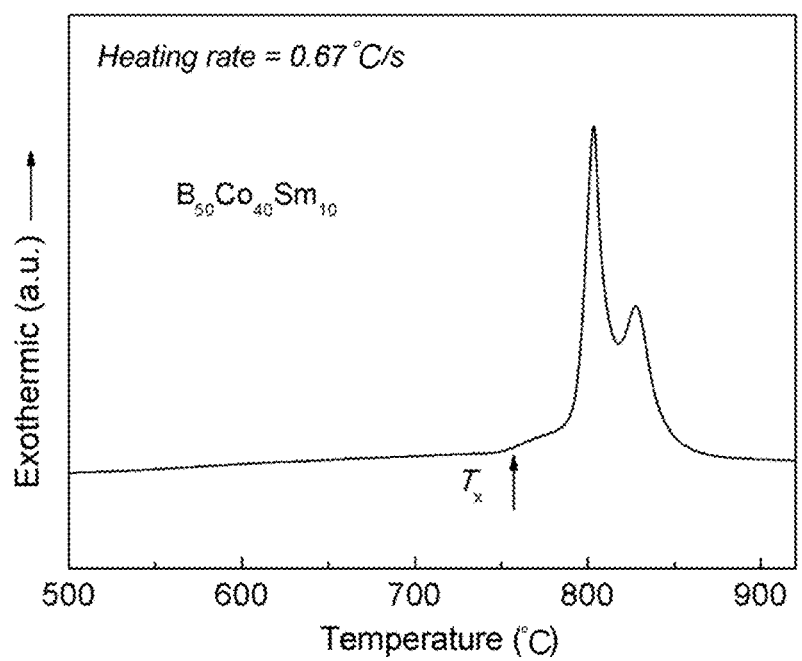
FIG. 3 shows a differential scanning calorimetric curve of a $B_{50}Co_{40}Sm_{10}$ amorphous alloy ribbon.

A differential scanning calorimeter (DSC) is used to evaluate the thermal properties of the alloy. FIG. 3 shows the DSC curve of the melt-spun alloy ribbon. It is determined that the onset temperature of crystallization ($T_x$) is 756° C. A microhardness tester with a load of 100 gf and dwell period of 10 s is adopted to test the Vickers hardness ($H_v$), and a four-probe method is used to test the room-temperature resistivity ($\rho$). The $H_v$ of the melt-spun alloy ribbon is 1518, and the p is 3.76 μΩm. Detailed data are listed in Table 1.

Embodiment 2: $B_{50}Co_{35}Sm_{15}$

Step I is the same as embodiment 1.

Step II: Melting the weighed raw materials with an induction melting furnace under the Ar atmosphere to prepare the master alloy ingot with uniform composition.

Steps III, IV and V are the same as embodiment 1. The amorphous alloy ribbon with a thickness of 35 μm is finally prepared. The $T_x$, $H_v$ and $\rho$ are listed in Table 1.

Embodiment 3: $B_{55}Co_{30}Sm_{15}$

The steps are basically the same as embodiment 1 in addition to changing the Ar atmosphere to a nitrogen atmosphere.

The amorphous alloy ribbon with a thickness of 30 pin is finally prepared. The $T_x$, $H_v$ and $\rho$ are listed in Table 1.

Embodiment 4: $B_{45}Co_{40}Sm_{15}$

The steps are the same as embodiment 1.
The amorphous alloy ribbon with a thickness of 35 pin is finally prepared. The $T_x$, $H_v$ and $\rho$ are listed in Table 1.

Embodiment 5: $B_{55}Co_{25}Sm_{20}$

The steps are the same as embodiment 1.
The amorphous alloy ribbon with a thickness of 30 pin is finally prepared. The $T_x$, $H_v$ and $\rho$ are listed in Table 1.

Embodiment 6: $B_{45}C_5Co_{40}Sm_{10}$

Step I: Raw materials including B, C, Co, and Sin with the purity of higher than 99 wt. % are weighed and mixed according to the nominal composition; Steps II, III, IV and V are the same as embodiment 1.
The amorphous alloy ribbon with a thickness of 30 pin is finally prepared. The $T_x$, $H_v$ and $\rho$ are listed in Table 1.

Embodiment 7: $B_{45}Si_5Co_{40}Sm_{10}$

Step I: Raw materials including B, Si, Co, and Sin with the purity of higher than 99 wt. % are weighed and mixed according to the nominal composition;
Steps II, III, IV and V are the same as embodiment 1.
The amorphous alloy ribbon with a thickness of 40 μm is finally prepared. The $T_x$, $H_v$ and $\rho$ are listed in Table 1.

Embodiment 8: $B_{45}Al_5Co_{40}Sm_{10}$

Step I: Raw materials including B, Al, Co, and Sin with the purity of higher than 99 wt. % are weighed and mixed according to the nominal composition;
Steps II, III, IV and V are the same as embodiment 1.
The amorphous alloy ribbon with a thickness of 30 μm is finally prepared. The $T_x$, $H_v$ and $\rho$ are listed in Table 1.

Embodiment 9: $B_{45}C_5Si_5Co_{35}Sm_{10}$

Step I: Raw materials including B, C, Si, Co, and Sin with the purity of higher than 99 wt. % are weighed and mixed according to the nominal composition;
Steps II, III, IV and V are the same as embodiment 1.
The amorphous alloy ribbon with a thickness of 32 μm is finally prepared. The $T_x$, $H_v$ and $\rho$ are listed in Table 1.

Embodiment 10: $B_{50}Co_{20}Fe_{20}Sm_{10}$

Step I: Raw materials including B, Co, Fe, and Sin with the purity of higher than 99 wt. % are weighed and mixed according to the nominal composition;
Steps II, III, IV and V are the same as embodiment 1.
The amorphous alloy ribbon with a thickness of 28 μm is finally prepared. The $T_x$, $H_v$ and $\rho$ are listed in Table 1.

Embodiment 11: $B_{50}Co_{30}Ni_{10}Sm_{10}$

Step I: Raw materials including B, Co, Ni, and Sin with the purity of higher than 99 wt. % are weighed and mixed according to the nominal composition;
Steps II, III, IV and V are the same as embodiment 1.
The amorphous alloy ribbon with a thickness of 32 μm is finally prepared. The $T_x$, $H_v$ and $\rho$ are listed in Table 1.

Embodiment 12: $B_{50}Co_{20}Fe_{10}Ni_{10}Sm_{10}$

Step I: Raw materials including B, Co, Fe, Ni, and Sin with the purity of higher than 99 wt. % are weighed and mixed according to the nominal composition;
Steps II, III, IV and V are the same as embodiment 1.
The amorphous alloy ribbon with a thickness of 30 μm is finally prepared. The $T_x$, $H_v$ and $\rho$ are listed in Table 1.

Embodiment 13: $B_{50}Co_{40}Er_{10}$

Step I: Raw materials including B, Co, and Er with the purity of higher than 99 wt. % are weighed and mixed according to the nominal composition;
Steps II, III, IV and V are the same as embodiment 1.
The amorphous alloy ribbon with a thickness of 25 μm is finally prepared. The $T_x$, $H_v$ and $\rho$ are listed in Table 1.

Embodiment 14: $B_{50}Co_{40}Gd_{10}$

Step I: Raw materials including B, Co, and Gd with the purity of higher than 99 wt. % are weighed and mixed according to the nominal composition;

Steps II, III, IV and V are the same as embodiment 1.

The amorphous alloy ribbon with a thickness of 35 μm is finally prepared. The $T_x$, $H_v$ and $\rho$ are listed in Table 1.

Embodiment 15: $B_{50}Co_{40}La_{10}$

Step I: Raw materials including B, Co, and La with the purity of higher than 99 wt. % are weighed and mixed according to the nominal composition;

Steps II, III, IV and V are the same as embodiment 1.

The amorphous alloy ribbon with a thickness of 40 μm is finally prepared. The $T_x$, $H_v$ and $\rho$ are listed in Table 1.

Embodiment 16: $B_{50}Co_{40}Y_{10}$

Step I: Raw materials including B, Co, and Y with the purity of higher than 99 wt. % are weighed and mixed according to the nominal composition;

Steps II, III, IV and V are the same as embodiment 1.

The amorphous alloy ribbon with a thickness of 35 μm is finally prepared. The $T_x$, $H_v$ and $\rho$ are listed in Table 1.

Embodiment 17: $B_{50}Co_{40}Sm_5La_5$

Step I: Raw materials including B, Co, Sin, and La with the purity of higher than 99 wt. % are weighed and mixed according to the nominal composition;

Steps II, III, IV and V are the same as embodiment 1.

The amorphous alloy ribbon with a thickness of 35 μm is finally prepared. The $T_x$, $H_v$ and $\rho$ are listed in Table 1.

Embodiment 18: $B_{55}Co_{30}Sm_5Er_5La_5$

Step I: Raw materials including B, Co, Sin, Er and La with the purity of higher than 99 wt. % are weighed and mixed according to the nominal composition;

Steps II, III, IV and V are the same as embodiment 1.

The amorphous alloy ribbon with a thickness of 30 μm is finally prepared. The $T_x$, $H_v$ and $\rho$ are listed in Table 1.

Embodiment 19: $B_{50}Co_{40}La_7Nb_3$

Step I: Raw materials including B, Co, La and Nb with the purity of higher than 99 wt. % are weighed and mixed according to the nominal composition;

Steps II, III, IV and V are the same as embodiment 1.

The amorphous alloy ribbon with a thickness of 28 μm is finally prepared. The $T_x$, $H_v$ and $\rho$ are listed in Table 1.

Embodiment 20: $B_{50}Co_{40}Sm_8Ta_2$

Step I: Raw materials including B, Co, Sin and Ta with the purity of higher than 99 wt. % are weighed and mixed according to the nominal composition;

Steps II, III, IV and V are the same as embodiment 1.

The amorphous alloy ribbon with a thickness of 30 μm is finally prepared. The $T_x$, $H_v$ and $\rho$ are listed in Table 1.

Embodiment 21: $B_{50}Co_{40}Sm_7Zr_3$

Step I: Raw materials including B, Co, Sin and Zr with the purity of higher than 99 wt. % are weighed and mixed according to the nominal composition;

Steps II, III, IV and V are the same as embodiment 1.

The amorphous alloy ribbon with a thickness of 32 μm is finally prepared. The $T_x$, $H_v$ and $\rho$ are listed in Table 1.

Embodiment 22: $B_{50}Co_{40}Gd_9W_1$

Step I: Raw materials including B, Co, Gd and W with the purity of higher than 99 wt. % are weighed and mixed according to the nominal composition;

Steps II, III, IV and V are the same as embodiment 1.

The amorphous alloy ribbon with a thickness of 35 μm is finally prepared. The $T_x$, $H_v$ and $\rho$ are listed in Table 1.

Embodiment 23: $B_{50}Co_{40}Gd_8Mo_2$

Step I: Raw materials including B, Co, Gd and Mo with the purity of higher than 99 wt. % are weighed and mixed according to the nominal composition;

Steps II, III, IV and V are the same as embodiment 1.

The amorphous alloy ribbon with a thickness of 30 μm is finally prepared. The $T_x$, $H_v$ and $\rho$ are listed in Table 1.

Embodiment 24: $B_{50}Co_{20}Fe_{10}Ni_{10}Sm_7Hf_3$

Step I: Raw materials including B, Co, Fe, Ni, Sin and Hf with the purity of higher than 99 wt. % are weighed and mixed according to the nominal composition;

Steps II, III, IV and V are the same as embodiment 1.

The amorphous alloy ribbon with a thickness of 30 μm is finally prepared. The $T_x$, $H_v$ and $\rho$ are listed in Table 1.

Comparison Example 1: $Co_{65}Sm_{10}B_{25}$

A low-B-content $Co_{65}Sm_{10}B_{25}$ alloy in the same Co—Sm—B system is selected for comparison. An amorphous alloy ribbon with a thickness of 30 μm is prepared and tested by the methods similar to those in embodiment 1. The $T_x$, $H_v$ and $\rho$ are listed in Table 1. It can be seen that the B-based amorphous alloys with high B contents have higher thermal stability, hardness and resistivity than the Comparison example 1.

Comparison Example 2: $Fe_{78}Si_9B_{13}$

Comparison Example 3: $Co_{70.3}Fe_{4.7}Si_{15}B_{10}$

Comparison Example 4: $Cu_{50}Zr_{45}Al_5$

The above three alloys are respectively selected from Fe-based soft magnetic amorphous ribbon $Fe_{78}Si_9B_{13}$ with an industrial number of 1K101, Co-based amorphous alloy $Co_{70.3}Fe_{4.7}Si_{15}B_{10}$ with high permeability and Cu—Zr-based bulk amorphous alloy $Cu_{50}Zr_{45}Al_5$ with high stability of the supercooled liquid. The $T_x$, $H_v$ and $\rho$ are listed in Table 1. It can be seen that the $T_x$, $H_v$ and $\rho$ values of the Comparison examples 2-4 are much lower than those of the B-based amorphous alloys provided in the present invention.

Comparison Example 5: $Si_{50}Al_{26}Fe_{10}Ni_7Cr_7$

Comparison Example 6: $Si_{55}Al_{20}Fe_{10}Cr_5Ni_5Zr_5$

The above two amorphous alloys are selected from the reference [D. V. Louzguine et al, Materials Transactions, JIM 38 (1997) 1095]. The $T_x$, $H_v$ and $\rho$ are listed in Table 1. It can be seen that, except that the $\rho$ value of the two alloys is higher than that of the B-based amorphous alloy of the present invention, the $T_x$ and $H_v$ values are much lower than those of the B-based amorphous alloy of the present invention.

TABLE 1

Alloy compositions and corresponding onset temperature of crystallization ($T_x$), Vickers hardness ($H_v$) and room-temperature resistivity ($\rho$) of embodiments of the present invention and comparison examples.

| | Alloy Composition (at. %) | $T_x$ (° C.) | $H_v$ | $\rho$ (μΩ · m) |
|---|---|---|---|---|
| Embodiment 1 | $B_{50}Co_{40}Sm_{10}$ | 756 | 1518 | 3.76 |
| Embodiment 2 | $B_{50}Co_{35}Sm_{15}$ | 707 | 1454 | 3.02 |
| Embodiment 3 | $B_{55}Co_{30}Sm_{15}$ | 742 | 1508 | 3.43 |
| Embodiment 4 | $B_{45}Co_{40}Sm_{15}$ | 708 | 1362 | 2.56 |
| Embodiment 5 | $B_{55}Co_{25}Sm_{20}$ | 724 | 1440 | 2.99 |
| Embodiment 6 | $B_{45}C_5Co_{40}Sm_{10}$ | 764 | 1532 | 3.81 |
| Embodiment 7 | $B_{45}Si_5Co_{40}Sm_{10}$ | 738 | 1481 | 4.02 |
| Embodiment 8 | $B_{45}Al_5Co_{40}Sm_{10}$ | 723 | 1414 | 2.62 |
| Embodiment 9 | $B_{45}C_5Si_5Co_{35}Sm_{10}$ | 785 | 1547 | 4.15 |
| Embodiment 10 | $B_{50}Co_{20}Fe_{20}Sm_{10}$ | 820 | 1460 | 3.56 |
| Embodiment 11 | $B_{50}Co_{30}Ni_{10}Sm_{10}$ | 765 | 1487 | 3.78 |
| Embodiment 12 | $B_{50}Co_{20}Fe_{10}Ni_{10}Sm_{10}$ | 771 | 1468 | 3.81 |
| Embodiment 13 | $B_{50}Co_{40}Er_{10}$ | 753 | 1523 | 3.14 |
| Embodiment 14 | $B_{50}Co_{40}Gd_{10}$ | 756 | 1516 | 4.28 |
| Embodiment 15 | $B_{50}Co_{40}La_{10}$ | 758 | 1501 | 3.25 |
| Embodiment 16 | $B_{50}Co_{40}Y_{10}$ | 754 | 1520 | 3.55 |
| Embodiment 17 | $B_{50}Co_{40}Sm_5La_5$ | 735 | 1500 | 3.62 |
| Embodiment 18 | $B_{55}Co_{30}Sm_5Er_5La_5$ | 749 | 1530 | 3.42 |
| Embodiment 19 | $B_{50}Co_{40}La_7Nb_3$ | 782 | 1570 | 3.82 |
| Embodiment 20 | $B_{50}Co_{40}Sm_8Ta_2$ | 780 | 1583 | 3.78 |
| Embodiment 21 | $B_{50}Co_{40}Sm_7Zr_3$ | 774 | 1564 | 3.82 |
| Embodiment 22 | $B_{50}Co_{40}Gd_9W_1$ | 769 | 1542 | 4.13 |
| Embodiment 23 | $B_{50}Co_{40}Gd_8Mo_2$ | 772 | 1570 | 3.99 |
| Embodiment 24 | $B_{50}Co_{20}Fe_{10}Ni_{10}Sm_7Hf_3$ | 787 | 1502 | 3.65 |
| Comparison example 1 | $Co_{65}Sm_{10}B_{25}$ | 635 | 1084 | 1.76 |
| Comparison example 2 | $Fe_{78}Si_9B_{13}$ | 497 | 900 | 1.37 |
| Comparison example 3 | $Co_{70.3}Fe_{4.7}Si_{15}B_{10}$ | 490 | 860 | 1.34 |
| Comparison example 4 | $Cu_{50}Zr_{45}Al_5$ | 500 | 546 | 2.00 |
| Comparison example 5 | $Si_{50}Al_{26}Fe_{10}Ni_7Cr_7$ | 438 | 926 | 11.70 |
| Comparison example 6 | $Si_{55}Al_{20}Fe_{10}Cr_5Ni_5Zr_5$ | 427 | 935 | 12.30 |

Finally, it should be noted that the above embodiments are only used for describing the technical solution of the present invention rather than limiting the present invention. Although the present invention is described in detail by referring to the above embodiments, those ordinary skilled in the art should understand that: the technical solution recorded in each of the above embodiments can be still amended, or part or all of technical features therein can be replaced equivalently; The amendments or replacements do not enable the essence of the corresponding technical solution to depart from the scope of the technical solution of various embodiments of the present invention.

The invention claimed is:

1. Boron-based amorphous alloys, wherein the composition formula of the alloys is $B_aCo_bRE_cX1_dX2_eX3_f$, where RE is any one or more of La, Ce, Pr, Nd, Sm, Gd, Dy, Er, and Y; X1 is any one or more of C, Si, and Al; X2 is any one or two of Fe and Ni; and X3 is any one or more of Zr, Nb, Mo, Hf, Ta and W;

and a, b, c, d, e, and f respectively represent atomic percent of each corresponding element in the formula, where $45 \leq a \leq 55$, $25 \leq b \leq 40$, $10 \leq c \leq 20$, $0 \leq d \leq 10$, $45 \leq a+d \leq 55$, $0 \leq e \leq 20$, $25 \leq b+e \leq 40$, $0 \leq f \leq 3$, $10 \leq c+f \leq 20$, and $a+b+c+d+e+f=100$;

where a preparation method for the boron-based amorphous alloys comprising:

(1) material mixing weighing and mixing raw materials including B, C, Si, Al, Co, Fe, Ni, La, Ce, Pr, Nd, Sm, Gd, Dy, Er, Y, Zr, Nb, Mo, Hf, Ta and W with purity higher than 99% according to the nominal composition of the alloy; adding extra 5 wt. % of volatile rare earth elements in this step;

(2) preparation of master alloy ingot placing the weighed mixture in step (1) into a water-cooled copper mold of a non-consumable arc furnace; melting the mixture under an argon or nitrogen atmosphere to obtain a master alloy ingot; repeatedly melting the alloy for four times to ensure chemical homogeneity; or putting the mixture in a crucible of an induction furnace, and melting the mixture under the argon or nitrogen atmosphere to obtain the master alloy ingot with chemical homogeneity;

(3) preparation of amorphous ribbon crushing the master alloy ingot, putting the master alloy ingot into a quartz tube, and preparing amorphous ribbon using a single copper roller melt-spinning technique under the argon or nitrogen atmosphere, heating the master alloy ingot to a molten state through induction smelting; then spraying the melt onto a copper roller rotating; and melt-spinning at a linear velocity for the copper roller surface of 20-40 m/s to obtain an amorphous alloy ribbon with a width of 1.5 mm and a thickness of 25-40 μm.

* * * * *